United States Patent Office 2,880,240
Patented Mar. 31, 1959

2,880,240

MAKING DINITROSOANILINES

John J. D'Amico and Ching C. Tung, Nitro, W. Va., assignors to Monsanto Chemical Company, St. Louis, Mo., a corporation of Delaware No Drawing. Application June 4, 1956
Serial No. 588,973

7 Claims. (Cl. 260—577)

The present invention relates to the making of dinitrosoanilines containing one nitroso substituent in the ring and one on the nitrogen.

Nitrosation of a secondary aromatic amines takes place readily in the presence of an excess of hydrochloric acid and under anhydrous conditions, as for example, in anhydrous methanol, p-nitrosoanilines form from secondary anilines. However, the yields of N,p-dinitrosoanilines have been low. Moreover, isolation of the intermediate p-nitrosoaniline has heretofore been necessary before proceeding with further nitrosation where the dinitroso compound was the desired end product.

In accordance with this invention it has been discovered that high yields of N,p-dinitroso secondary anilines may be obtained without isolating the intermediate p-nitroso secondary aniline by carrying out the nitrosation in the presence of a carefully controlled limited excess of hydrochloric acid. The excess of hydrochloric acid has been reported to have little effect on the nitrosation of secondary aromatic amines but this is not the case with p-nitroso N-aliphatic aromatic amines. However, excellent yields result if the excess hydrochloric acid remaining at the end of the reaction is within the range of 0.0–0.3 mole per mole of p-nitrosoamine charged. Of course, the intermediate can be isolated if desired but better results are obtained by adding water and an inorganic base to the anhydrous alcoholic reaction mixture after completing the ring nitrosation.

Nitrosation of N-aliphatic anilines may be carried out in known manner by treating the base with sodium nitrite in the presence of an excess of concentrated anhydrous alcoholic hydrogen chloride. In the preferred operation 4 moles of hydrogen chloride are charged per mole of secondary aniline. This reaction is essentially quantitative. After completing the ring nitrosation water is added together with 1.4–1.7 molecular equivalents of inorganic base to neutralize partially the hydrochloric acid before the N-nitrosation and the reaction mixture is treated with slightly more than the theoretical quantity of sodium nitrite.

The process is applicable to a variety of N-aliphatic anilines, examples of which are N-methyl aniline, N-ethyl aniline, N-propyl aniline, N-isopropyl aniline, N-butyl aniline, N-isobutyl aniline, N-cyclohexyl aniline and N-2-chloroallyl aniline.

The following example will illustrate the principles of the invention in detail: A glass-lined reactor equipped with an agitator, cooling system, thermometer and hydrogen chloride inlet line was charged with 140 parts by weight of anhydrous methanol. The methanol was cooled to 0° C. and hydrogen chloride gas bubbled in at 0 to 10° C. until a concentration of 40–42% hydrogen chloride was achieved. To the stirred hydrogen chloride-methanol solution at 5° C. was added 68.5 parts by weight of N-methyl aniline over a 0.5 to 1.0 hour period while maintaining the temperature at 5–15° C. After cooling the amine hydrochloride-methanol solution to 5° C., 51.2 parts by weight of 97% sodium nitrite was added over a period of 15 to 30 minutes. External cooling was then removed and the temperature of the reaction mixture allowed to rise to 25° C. Stirring was continued at 25–30° C. until reaction was complete as determined by complete solubility of 5 ml. of the reaction mixture in 25 ml. of 5% aqueous sodium hydroxide.

To the resulting slurry of p-nitroso N-methyl aniline hydrochloride was added 269 parts by weight of water while maintaining the temperature at a maximum of 30° C. The reaction mixture was then cooled to 10° C. and 163.2 parts by weight of 25% sodium hydroxide added at 10–15° C. over a 15 minute period. The reaction mixture was cooled to 5° C. and 51.2 parts by weight of 97% sodium nitrite dissolved in 204.8 parts by weight of water added at 5–10° C. over a 1 hour period. The temperature was maintained within this range for an additional hour and the reaction mixture neutralized to a pH of 7 with 25% aqueous sodium hydroxide. The resulting precipitate was removed by filtration, washed with water until the washings were free of chloride and dried at a maximum temperature of 50° C. to yield N,4-dinitroso-N-methyl aniline. The yield was above 90% of a product melting at 93–4° C.

The table below illustrates the effect of excess hydrochloric acid. The intermediate was prepared by condensing one mole of N-methyl aniline with 1.125 moles of sodium nitrite in 4 moles of hydrogen chloride dissolved in methanol, concentration 39.8–41.8%. The hydrogen chloride was then partially neutralized with 25% aqueous sodium hydroxide as for example 1.45–1.70 molecular equivalents and another 1.125 moles of sodium nitrite added. Other bases, as for example sodium carbonate, may be used but are less convenient. In experiment No. 12 N-ethyl aniline was the reactant and neutralization was effected with 6.6% aqueous sodium carbonate.

| Exp. No. | Base—Mole Equivalent Added | Moles of HCL At Start of Nitrosation | Moles of HCl Remaining At End | Yield Percent |
|---|---|---|---|---|
| 1 | none | 2.875 | 1.75 | 15.2 |
| 2 | 1.30 | 1.575 | 0.45 | 76.5 |
| 3 | 1.40 | 1.475 | 0.35 | 80.0 |
| 4 | 1.42 | 1.455 | 0.33 | 83.0 |
| 5 | 1.43 | 1.445 | 0.32 | 83.6 |
| 6 | 1.44 | 1.435 | 0.31 | 85.5 |
| 7 | 1.45 | 1.425 | 0.30 | 89.7 |
| 8 | 1.47 | 1.405 | 0.28 | 90.5 |
| 9 | 1.52 | 1.355 | 0.23 | 91.0 |
| 10 | 1.53 | 1.345 | 0.22 | 91.0 |
| 11 | 1.55 | 1.325 | 0.20 | 93.4 |
| 12 | 1.56 | 1.315 | 0.19 | 91.1 |
| 13 | 1.60 | 1.275 | 0.15 | 94.6 |
| 14 | 1.65 | 1.225 | 0.10 | 91.5 |
| 15 | 1.75 | 1.125 | 0.00 | 88.5 |
| 16 | 1.81 | 1.063 | [1] −0.062 | 77.5 |

[1] Moles excess base remaining.

It is intended to cover all changes and modifications of the examples of the invention herein chosen for purposes of disclosure which do not constitute departures from the spirit and scope of the invention.

What is claimed is:

1. In the process of nitrosating secondary anilines in a reaction medium containing water by reacting with a metal nitrite and hydrochloric acid employing as the secondary aniline C-nitroso secondary aniline, the improvement which consists in employing 0.0–0.3 mole excess hydrochloric acid per mole of C-nitroso secondary aniline.

2. The process of claim 1 in which the C-nitroso secondary aniline is p-nitroso-N-methylaniline.

3. In the process of nitrosating secondary anilines in a reaction medium containing water by reacting sodium nitrite and hydrochloric acid employing as the secondary aniline C-nitroso secondary aniline, the improvement which consists in employing 0.0-0.3 mole excess hydrochloric acid per mole of C-nitroso secondary aniline.

4. The process of claim 3 in which the C-nitroso secondary aniline is p-nitroso-N-methylaniline and an excess of about 0.15 mole hydrochloric acid is used.

5. The process of making N-p-dinitrosoanilines after forming a p-nitrosoaniline by condensing N-lower alkyl aniline with a nitrite in concentrated anhydrous alcoholic hydrogen chloride which comprises adding water to the alcoholic reaction mixture, then treating the aqueous mixture at 5-10° C. with sodium nitrite in the presence of hydrochloric acid the quantity of hydrochloric acid being within the range of 0.0-0.3 mole excess per mole of p-nitrosoaniline.

6. The process of making N-p-dinitrosoanilines after forming a p-nitrosoaniline by condensing N-lower alkyl aniline with a nitrite in concentrated anhydrous alcoholic hydrogen chloride containing 4 moles of hydrogen chloride per mole of N-lower alkyl aniline which comprises adding water and 1.45-1.75 moles of sodium hydroxide to the alcoholic reaction mixture and treating the aqueous mixture at 5-10° C. with sodium nitrite to effect N-nitrosation.

7. The process of claim 6 in which the N-lower alkyl aniline is N-methylaniline.

References Cited in the file of this patent

UNITED STATES PATENTS

| | | |
|---|---|---|
| 2,560,893 | Roberts | July 17, 1951 |
| 2,782,235 | Lantz et al. | Feb. 19, 1957 |

OTHER REFERENCES

Blatt: Org. Syntheses, Coll., vol. II, page 460, 1943.